Patented Aug. 24, 1926.

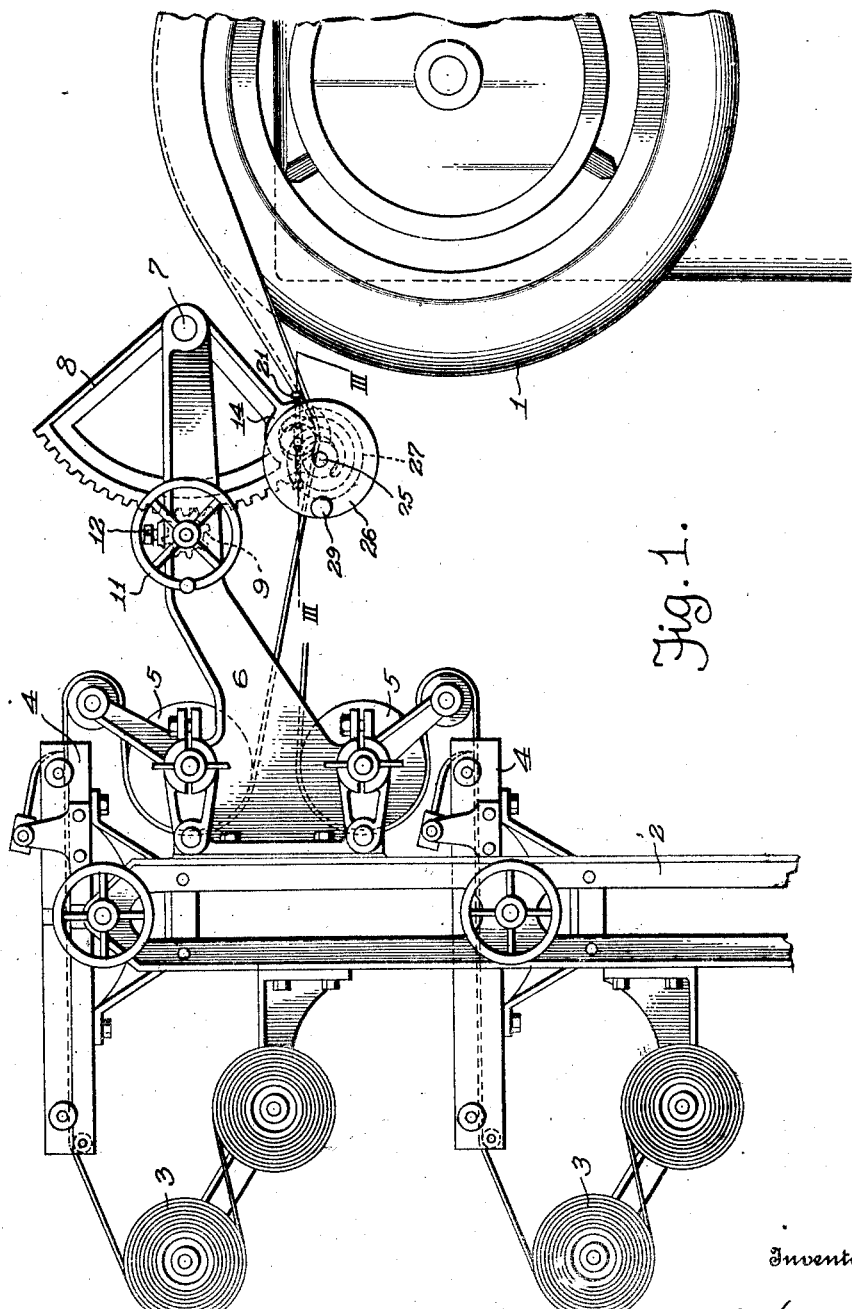

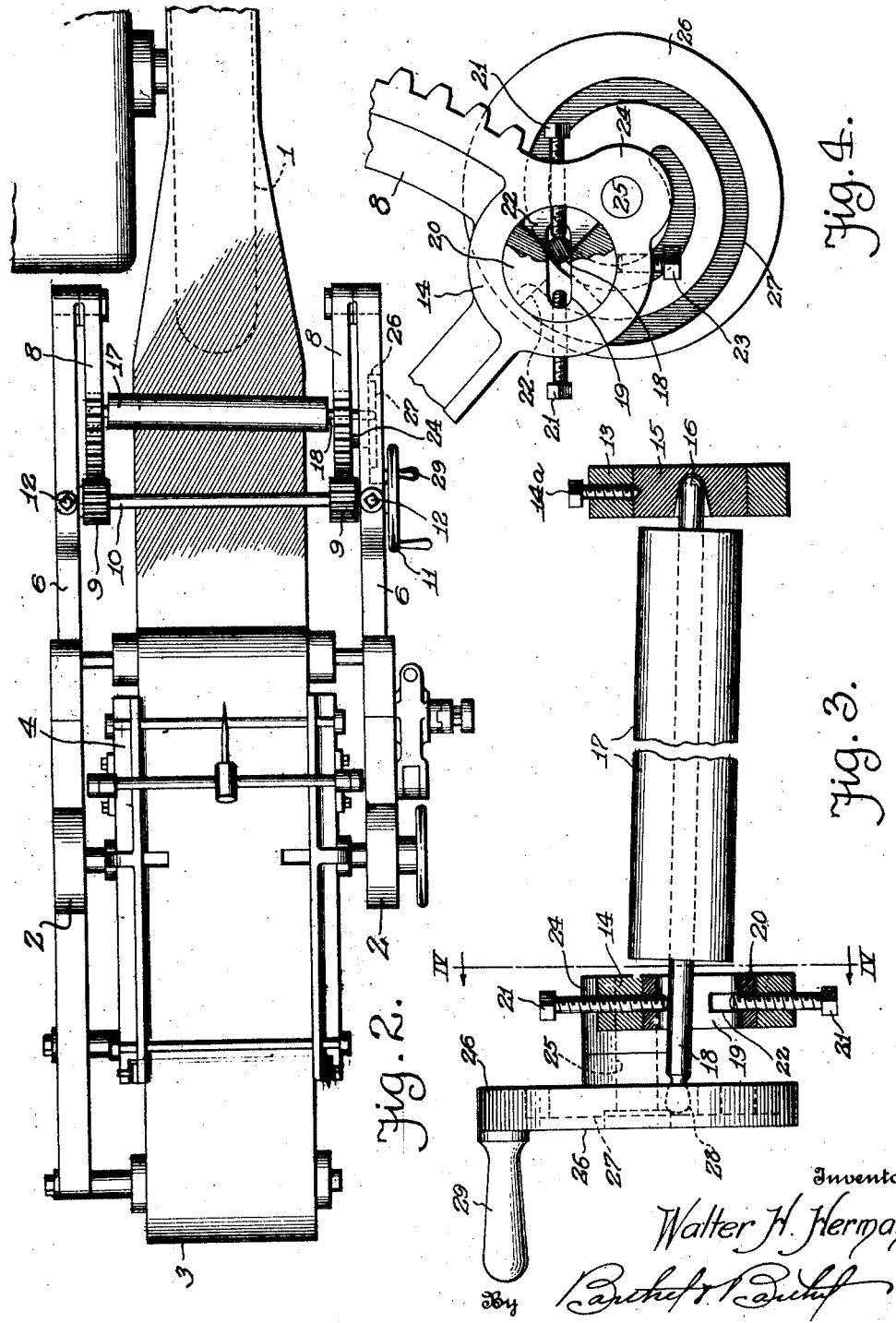

1,597,154

UNITED STATES PATENT OFFICE.

WALTER H. HERMANN, OF COLUMBUS, OHIO, ASSIGNOR TO HERMANN TIRE BUILDING MACHINE COMPANY, OF COLUMBUS, OHIO, A CORPORATION OF OHIO.

TIRE-BUILDING MACHINE.

Application filed July 23, 1921. Serial No. 486,954.

In the manufacture or building of tires by machines, for instance, of the type disclosed by my Patent No. 1,159,840, granted Nov. 9, 1915, or No. 1,368,929, granted Feb. 15, 1921, the tire material or stock is guided by the machine on to a carcass or core, and such guiding of the tire material or fabric is satisfactory for certain types of tire, but when "corded" or any heavily biased fabric is to be included in a tire structure and guided on to a carcass or core difficulty is experienced in maintaining a strip of fabric always in alinement with the core, so that a medial line of the strip of fabric will at all times be in the central plane of rotation of the carcass or core. This is necessary in order that the strip of fabric may be evenly applied to the carcass or core, that is, with equal portions of the fabric on the sides of the carcass or core, but due to the biased and somewhat roughened surface of the corded fabric, it has a tendency to creep or shift sidewise when contacting with a guide roller; the direction in which the strip of fabric tends to shift depending on the bias of the cord or reinforcing members in the piece of fabric. The building of cord tires requires the constant attention of an artisan to see that the fabric is evenly applied to a tire body during its fabrication and even with the best of attention, delays are often incurred inaccuracies noted that cannot be readily rectified, and often considerable trimming required.

My invention, in its broadest aspect, involves means for counteracting the sidewise movement of a strip of fabric when being guided by a roller, or other device onto a tire carcass or core. To this end, the means which I employ is associated with a guide roller that may be bodily raised and lowered relative to a core or the like to insure a desired degree of tension on the fabric as it is built into a tire body, and additional means are employed for changing the axis of rotation of the guide roller, in accordance with the nature of the fabric, so that the guide roller by its contact with the fabric will act against the fabric and maintain it in perfect alinement with the core or tire body being built thereon.

My invention further aims to provide eccentric means, in a manner as hereinafter set forth, for changing the axis of rotation of a guide roller or similar member, and fixing the roller or member so that it will remain in an adjusted position and at all times act against fabric or other material to keep the fabric or material in a defined guided relation relative to the guide roller or member.

The construction entering into my invention will be hereinafter described and then claimed, and reference will now be had to the drawings, wherein Figure 1 is a side elevation of a portion of a tire building machine, either of the stationary or movable type, provided with my improvement and showing its relation to a core;

Fig. 2 is a plan of the same;

Fig. 3 is an enlarged horizontal sectional view taken on the line III—III of Fig. 1; and Fig. 4 is a longitudinal sectional view taken on the line IV—IV of Fig. 3.

In order that my improvement may be understood, I show a revoluble core 1 in proximity to a tire building machine, which includes stationary or movable uprights 2, one or more stock rolls 3, one or more tables 4, and one or more tension rollers 5. The tension rollers 5 are supported by brackets 6 carried by the uprights 2, and the fabric or stock from the rolls 3 is adapted to pass over the tables 4 and upwardly over the tension rollers 5 on to the core 1; it being optional with the builder of the tire as to the size and grade of fabric to be used, since the two-unit machine carries two sizes or grades of material and either may be selected or both used during the fabrication of the tire.

Pivotally connected to the outer ends of the brackets 6, by pins 7 or other pivotal means are segment racks 8 meshing with pinions 9 mounted on a transverse shaft 10, journaled in the brackets 6, and one end of the shaft 10 has a hand wheel 11 by which the shaft may be conveniently rotated to adjust the segment racks 8 relative to said brackets. The shaft 10 may be fixed relative to the bracket by set screws 12 or other holding means so that the segment racks 8 will not become accidentally displaced after being adjusted.

The lower portions of the segment racks 8 are enlarged to provide bearings 13 and 14 and mounted in the bearing 13 and retained therein by a set screw 14ª or other fastening means is a pintle bearing 15 for the pintle or end 16 of a roller or fabric engaging member 17. The roller 17 may be made of any material that will present a friction producing surface, similar to rubber, when engaging a strip of fabric, and said roller has a long pintle 18 extending through a slot 19 in a pintle bearing 20, said pintle bearing being adjustable in the bearing 14 of the segment rack 8. The bearing 14 has opposed set screws 21 extending into the slot 19 to limit the movement of the pintle 18 in the slot 19, and the bearing 20 has slots 22 providing clearance for the inner ends of the set screws 21, so that the segment racks 8 may be adjusted, especially when the bearing 20 is fixed relative to the bearing 14 by a set screw 23.

The bearing 14 has an offset bearing 24 for a stub shaft 25 which is rotatable in the bearing 24 and is provided with a cam or eccentric wheel or member 26. The inner face of the cam wheel 26 has a spiral groove 27 into which extends a head 28 on the long pintle 18. On the outer face of the cam wheel 26 is a handle 29 by which the cam wheel may be rotated.

The length of the slot 19 defines the movement of the long pintle 18 longitudinally of said slot, and the adjustment of the long pintle therein may be limited by the set screws 21. As shown in Fig. 4, the spiral groove 27 is actually of greater length than necessary, and it will be noted that the long pintle 18 is confined between a wall of the groove 27 and the inner end of one of the set screws 21. By turning the cam wheel 26, in a counterclockwise direction, considering Fig. 4, the cam wheel may shift the long pintle 18 out of engagement with the set screw 21 and towards the opposite end of the slot 19. In so shifting the long pintle 18, with the short pintle 16 serving as a pivot for the fabric engaging roller 17, the axis of rotation of the roller is changed relative to the strip of fabric. Ordinarily such a roller has its axis parallel to the shaft 10, considering Fig. 2, but when cord fabric is to be built into a tire body, I arrange the axis of the roller 17 at an angle to the shaft 10, as shown in Fig. 2, whereby rotation of the roller 17 by contact with the strip of fabric will resist sidewise movement of the strip of fabric and at all times retain the strip in alinement with the core 1, thus permitting of the strip being evenly and uniformly applied.

In Fig. 2 I have indicated the angularly disposed cords or biased surface of the fabric as the contacts of the roller 17, and if this roller had its axis of rotation parallel with the shaft 10, the fabric would tend to creep to one side, for instance towards that side of the machine provided with the cam wheel 26. By swinging the end of the roller so that it will lie at an angle relative to the shaft 10, the friction between the surface of the roller 17 and the strip of fabric will counteract the tendency of the strip of fabric to shift sidewise, and by properly adjusting the roller 17 the effect of said roller on the fabric may accurately counteract the sidewise movement of the fabric and thus maintain the strip of fabric in perfect alinement with the core. In other words, one force counterbalances the other and with the center line marked on the strip of fabric and a center line on the core the two lines may be matched and the fabric constantly maintained in position for an even application to the core or a body being built thereon. Any variations may be rectified by simply adjusting the roller 17 one way or the other, and while I have shown a mechanism which may be conveniently used for adjusting the roller 17, I would have it understood that the mechanical equivalents of such mechanism may be resorted to without departing from the scope of the appended claims.

What I claim is:—

1. A guide roller having pintles, bearings for said roller pintles, one of said bearings forming a pivot for one of said pintles, and rotatable means adjacent the other of said bearings for laterally adjusting the pintle therein relative to its pivot, said means including a spirally grooved member into the groove of which extends the pintle of said roller.

2. The combination of opposed racks, pinions for adjusting said racks, a bearing at one end of each rack, a roller having a pintle in each bearing, with one of said pintles serving as a pivot for said roller, and a rotary member supported from one of said racks adapted for adjusting one of the roller pintles in its bearing.

3. In a tire building machine from which material may travel to a core for the fabrication of a tire thereon, a roller for producing a tension on the material to cause it to travel in an unwavering direction to the core and be applied to the core with a requisite degree of smoothness, and means for adjusting said roller, said means including adjustable racks in planes at the sides of the material supporting the ends of said roller, and means carried by one of said racks adapted for changing in a lateral direction the axis of rotation of said roller.

4. A tire building machine as in claim 3, characterized by the last mentioned means including a cam member and a bearing, the latter causing the end of the roller to move in a lateral plane when actuated by the former.

5. In a tire building machine from which material may travel to a core for fabrication of a tire on the core, a roller for producing a tension on the material, pintles carried by said roller, one of said pintles being pivotally supported, and a spirally grooved member in a plane at a right angle to a transverse axis of the machine and into which member one of said pintles extends so that said roller may be shifted at an angle to the transverse axis of said machine.

6. A tire building machine as called for in claim 5, and guiding means for the last mentioned pintle.

In testimony whereof I affix my signature.

WALTER H. HERMANN.